Figure 1:
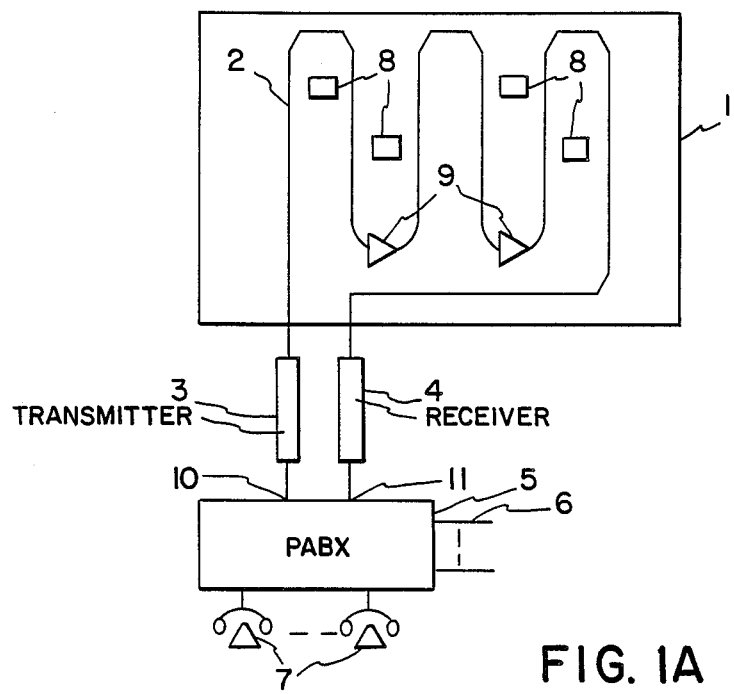

United States Patent [19]

Carey et al.

[11] Patent Number: 4,866,732
[45] Date of Patent: Sep. 12, 1989

[54] WIRELESS TELEPHONE SYSTEM

[75] Inventors: Michael J. Carey, Woolaston, England; Adrian J. Anderson, Newport, Wales

[73] Assignee: Mitel Telecom Limited, Gloucestershire, England

[21] Appl. No.: 819,044

[22] Filed: Jan. 15, 1986

[30] Foreign Application Priority Data

Feb. 4, 1985 [GB] United Kingdom ................ 8502735

[51] Int. Cl.$^4$ .................. H04B 15/00; H04K 1/00
[52] U.S. Cl. .................................. 375/1; 379/63; 455/55
[58] Field of Search ............. 375/1, 115, 74; 455/53, 455/54, 55, 33; 179/2 E, 2 C, 18 AD, 18 ES; 370/107; 379/63, 93

[56] References Cited

U.S. PATENT DOCUMENTS

| 3,916,311 | 10/1975 | Martin et al. | 455/55 |
| 4,012,662 | 3/1977 | Martin | 455/55 |
| 4,059,728 | 11/1977 | Milkes | 179/2 E |
| 4,105,872 | 8/1978 | Parise et al. | 179/18 AD |
| 4,355,411 | 10/1982 | Reudink | 455/33 |
| 4,436,962 | 3/1984 | Davis et al. | 179/18 AD |
| 4,443,661 | 4/1984 | Kubo | 379/58 |
| 4,455,651 | 6/1984 | Baran | 375/1 |
| 4,475,208 | 10/1984 | Ricketts | 379/93 |
| 4,476,574 | 10/1984 | Struven | 455/55 |
| 4,532,635 | 7/1985 | Mangiulis | 375/1 |
| 4,538,281 | 8/1985 | Rajan | 375/1 |
| 4,555,805 | 11/1985 | Talbot | 379/63 |
| 4,587,661 | 5/1986 | Schiff | 375/1 |

OTHER PUBLICATIONS

Isberg "Guided Radio Communication in Tunnels, Mines, Canyons and Buildings", Notice for Grid Calendar, May 15, 1979.

Primary Examiner—Robert L. Griffin
Assistant Examiner—Stephen Chin
Attorney, Agent, or Firm—Antonelli, Terry & Wands

[57] ABSTRACT

A wireless telephone communication system for wireless, voice, data or voice and data terminals comprising apparatus at a central location for receiving one or a plurality of signals for communication with selected ones of wireless communication terminals, apparatus for converting the signals to spread spectrum radio frequency signals, a leaky transmission line located in a communication region, apparatus for applying the spread spectrum radio frequency signals to the transmission line for electromagnetic radiation within the region, at least one wireless communication terminal adapted to receive a predetermined one of the spread spectrum radio frequency signals and for demodulating it into an intelligible signal.

26 Claims, 3 Drawing Sheets

WIRELESS TELEPHONE SYSTEM

This invention relates to a telephone communication system utilizing wireless voice, data, or voice and data terminals.

It is often difficult to provide telephone service to personnel who are continuously moving, yet must be quickly available at a telephone or data terminal, e.g. warehouse stock takers, personnel responsible for building maintenance or security, etc. Paging receivers have been used to summon such personnel to call a number via the closest telephone set. Sometimes such personnel are required to enter data into a terminal for storage at a central computer. Yet wired jacks for interfacing a telephone with a PABX or terminal to a computer are often spaced at substantial distances from each other in warehouses, for example.

Voice communication of such personnel has been partly solved by the use of cordless (wireless) telephones each operating at a different frequency from the other. However such telephones have exhibited substantial problems. There are usually a limited number of channels available, limiting the number of telephone/wireless receiver sets which can be used in a given area. Often interference from adjacent channels or other services is encountered. Transmission or reception nulls are often encountered when a cordless telephone is oriented in a particular direction relative to the main transmitting and receiving station. Such nulls are also caused by shielding by steel and concrete of which the building housing the system is built. The system lacks privacy; since the common radio bands are used, the signals can be readily intercepted.

In addition, the use of wireless presents a range problem. Particularly for large areas, such as when an entire building, a large warehouse, or aircraft hangar, etc., is to be covered by the system, a high powered central transmitter could be used. However the power of the transmitter cannot be greater than a level prescribed by the regulatory agencies. This places a limitation on the communication range. In the event that many low power transmitters are used scattered around the building, the cost increases substantially.

In the system described in U.S. Pat. No. 4,462,113 issued July 24, 1984, domestic A.C. power lines are used as an antenna for a low power transmitter. However in this case the null problem still exists, and in addition there is a severe bandwidth limitation to below approximately 150 or 200 kHz. Further, transmission of signals via the A.C. power lines is notoriously insecure, since such signals are often carried by the power lines to neighbouring offices and buildings.

Due to the inherent lack of security, nulls and power/distance limitations, the use of a mobile telephone handset has been limited to the home environment, or to very special applications Until the present invention was made it had not yet been found suitable for commercial applications in which, for example, an entire multi-story building housing many different companies, some possibly being competitors with each other, could be served mobile telephone and data services reliably from the same PABX. Such prior art systems could not ensure complete security of communications, sufficiently low power radiation outside the confines of the building, and absences of nulls or fade areas within structures.

Clearly for the above reasons portable terminals could also not be used for reliable transmission and reception of data to a central computer.

The present invention provides a communication system which can be connected to a PABX switching system, which solves the problems noted above. In addition to the provision of secure mobile (wireless) communications in a low power environment with the substantial elimination of the null or fade areas, it provides multi-channel wideband communications which can reliably carry voice, data and signalling (supervisory) signals.

According to the present invention leaky transmission cables are used to radiate and to receive communication signals within the communication region. While at single frequencies such cables exhibit nulls along the cables at regular intervals, the communication signals which are carried and which are received in the present invention are spread spectrum.

The use of spread spectrum signals carried by a leaky cable transmission system achieves several highly desirable results. Firstly, nulls are virtually undetectable or are eliminated due to the spreading of the signals over a wide bandwidth. Secondly, since pseudo-noise bandwidth spreading (correlation) code is used for each channel, privacy of communications is virtually assured as well as immunity from interference between channels.

Since a leaky cable is used to distribute the signal in the communication region, the transmitter power and resulting effective radiated power can be very low. Furthermore, the power which is used is spread amongst the frequencies of a wide bandwidth, further reducing the power used at any one frequency. Thus the interference that may be caused to other radio signals outside of the building is virtually nil. Also the radiated power within the building can be increased to a substantial degree in comparison with a non-spread spectrum, single or multi-point antenna transmitter to minimize the bit error rate, yet the effective interference with external or other wireless services remains virtually nil, while the reliability of communication within the building is increased.

The spread spectrum-leaky cable system according to this invention can operate side-by-side with other similar systems or with conventional AM or FM wireless systems with substantially no or minimal interference. The maximum interference which might be apparent in such other systems would merely be an increase in the background noise level.

The various handsets or wireless remote terminals to be used in the present system are preferred to be accessed by address code on a supervisory channel, and to be controlled to internally select a pseudo-noise correlation code which matches a predetermined channel transmit pseudo-noise spreading code. This type of system would benefit by the use of universal wireless handsets or terminals. However in another type of system each handset or terminal is channel fixed with a predetermined pseudo-noise correlation code circuit, and the head end terminal changes its transmit pseudo-noise spreading code to suit that of the selected handset.

In the reverse transmission direction which uses a different RF centre frequency the mobile handset is either fixed with a transmit pseudo-noise spreading code for encoding the transmitted signal, or it can be caused to transmit on a channel selected by the head end under control of the head end via signals on the supervisory channel.

Leaky cable transmission systems have long been used to communicate in tunnels and mines. One such system is described in U.S. Pat. No. 4,476,574 issued Oct. 9, 1984. A large number of publications is listed in that patent which will provide background information to the reader on the use of leaky feeder communication systems both subsurface and above the surface of the earth. However those systems suffer from one or more of the problems described above which restrict them from use in a reliable commercial communication system. A text which describes leaky feeder systems is LEAKY FEEDERS AND SUBSURFACE RADIO COMMUNICATIONS by P. Delogne, IEE Electromagnetic Waves Series 14, 1982 Peter Peregrinus Ltd.

Spread spectrum systems have been used in wireless systems in the past, as well as in certain specialized wired systems. A wireless spread spectrum system is described in U.S. Pat. No. 4,455,651 issued June 19, 1984 and in U.S. Pat. No. 4,086,504 issued Apr. 25, 1978. However in both those cases the power limitation problem and the null problem described above did not present problems, since in the first case directional antennas were used, and in the second case high power could be used and the system was not used in a communication system of the present kind. Furthermore, the locations of the various transmitting stations used in the latter patent, which relates to a seismic exploration system, can all be tested for proper spectrum prior to use and the transmitters moved in case a null is encountered. In addition, the locations of the spread spectrum transceivers are all fixed and preknown, since they are used for triangulation purposes.

Spread spectrum systems have also been used in wired systems. For example in U.S. Pat. No. 4,438,519 issued Mar. 20, 1984, a spread spectrum system is used connected to an A.C. power line, which is not a leaky feeder transmission cable, but constitutes an antenna. In that patent, however, it is clear that the bandwidth of the power line is very low, and the transmission region is limited to areas which are not isolated by a transformer. Hence such systems are not useful for wide band multi-channel voice and data communication systems.

A spread spectrum signal is applied to telephone lines in the invention described in U.S. Pat. No. 4,475,208 issued Oct. 2, 1984. In this system data signals are converted to spread spectrum and are transmitted simultaneously with voice over already existing telephone lines which are not leaky feeder transmission cables. The bandwidth of such telephone lines is so low that the data signals are of very low bit rate. Clearly the system is not suitable for use in multi-channel wide bandwidth transmission. In addition, the system is unsuitable for use with wireless handsets or terminals since the telephone transmission lines cannot carry radio frequency signals for any significant distance.

A general description of the history and structure of spread spectrum systems will be found in the publication SPREAD-SPECTRUM COMMUNICATIONS, edited by Charles E. Cook et al, published by the IEEE Press, Institute of Electrical and Electronic Engineers, Inc.

Carriage of a plurality of spread spectrum communication signals, each modulated by a different pseudorandom spreading or correlation code, by a leaky cable transmission system thus provides a new form of wireless mobile voice and data communication system previously not thought possible, that is, a reliable, private and low power communication system using a large number of noted telephone handsets that can be carried within a predefined environment which can be used sharing the same bandwidth as other commercial wireless services without interference between the two kinds of systems. Such a system for the first time is viable within a building structure, i.e. steel and concrete, which previously would not reliably support reliable wireless communication to the required degree.

Because of the broadband and multi-channel capability of the present system, the various mobile telephone sets can be provided with a full range of features normally made available only to wired telephone sets by the PABX, such as local alphanumeric display, conferencing, abbreviated dialing, etc., as well as computer access, remote control of various apparatus such as automatic door locks, etc. Such features are not now possible with the well known cordless telephones. A 32 channel system of the type described herein could give typically 200 users at a site mobile telephone facility depending on traffic. Further, the communication channel between the remote mobile unit and a PABX which connects to a larger computer can provide to the remote unit enormous computational power which would otherwise not be available in a hand held computer due to its size and cost limitations, and since a large shared data base can be stored at the central computer.

A preferred embodiment of the invention is a wireless communication system comprising apparatus at a central location for receiving one or a plurality of signals for communication with selected ones of wireless communication terminals, apparatus for converting the signals to spread spectrum radio frequency signals, a leaky transmission line located in a communication region, apparatus for applying the spread spectrum radio frequency signals to the transmission line for electromagnetic radiation within the region, at least one wireless communication terminal adapted to receive a predetermined one of the spread spectrum radio frequency signals and for demodulating it into an intelligible signal.

The invention also facilitates any of the wireless communication terminals to initiate a communication with the central location, such a communication being capable of having as its final destination any telephone connectable to the central location, including others of the wireless communication terminals.

Figure 1A:
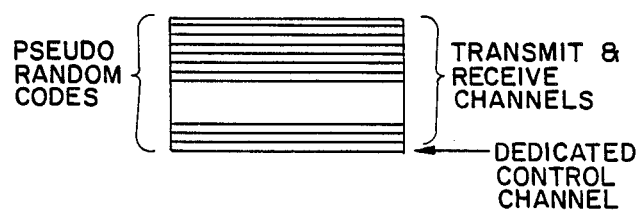
Figure 4:
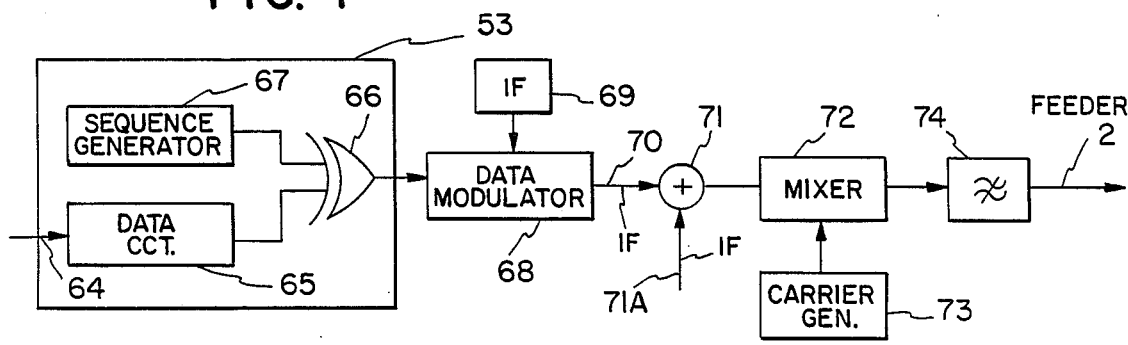
Figure 2:
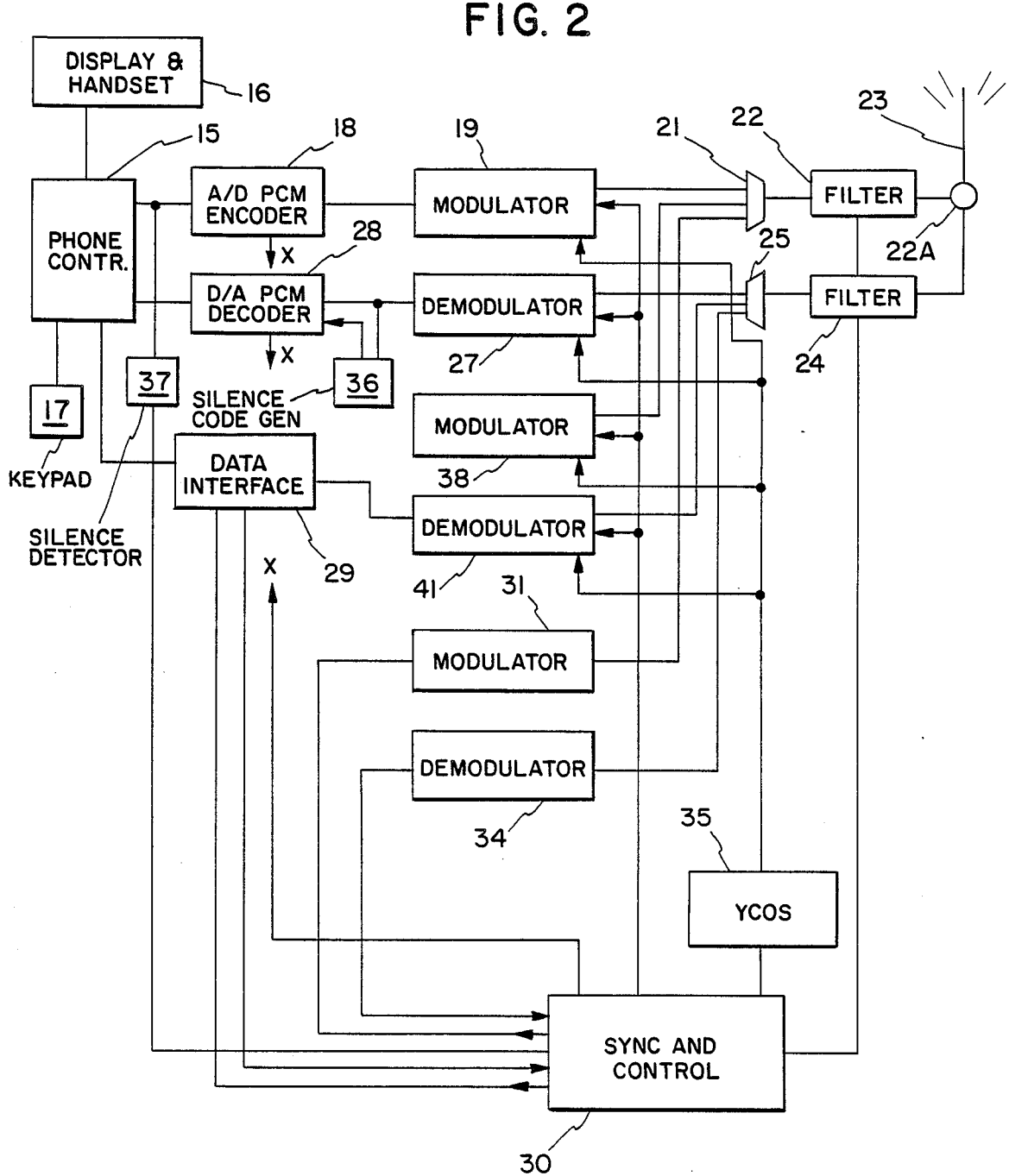
Figure 3:
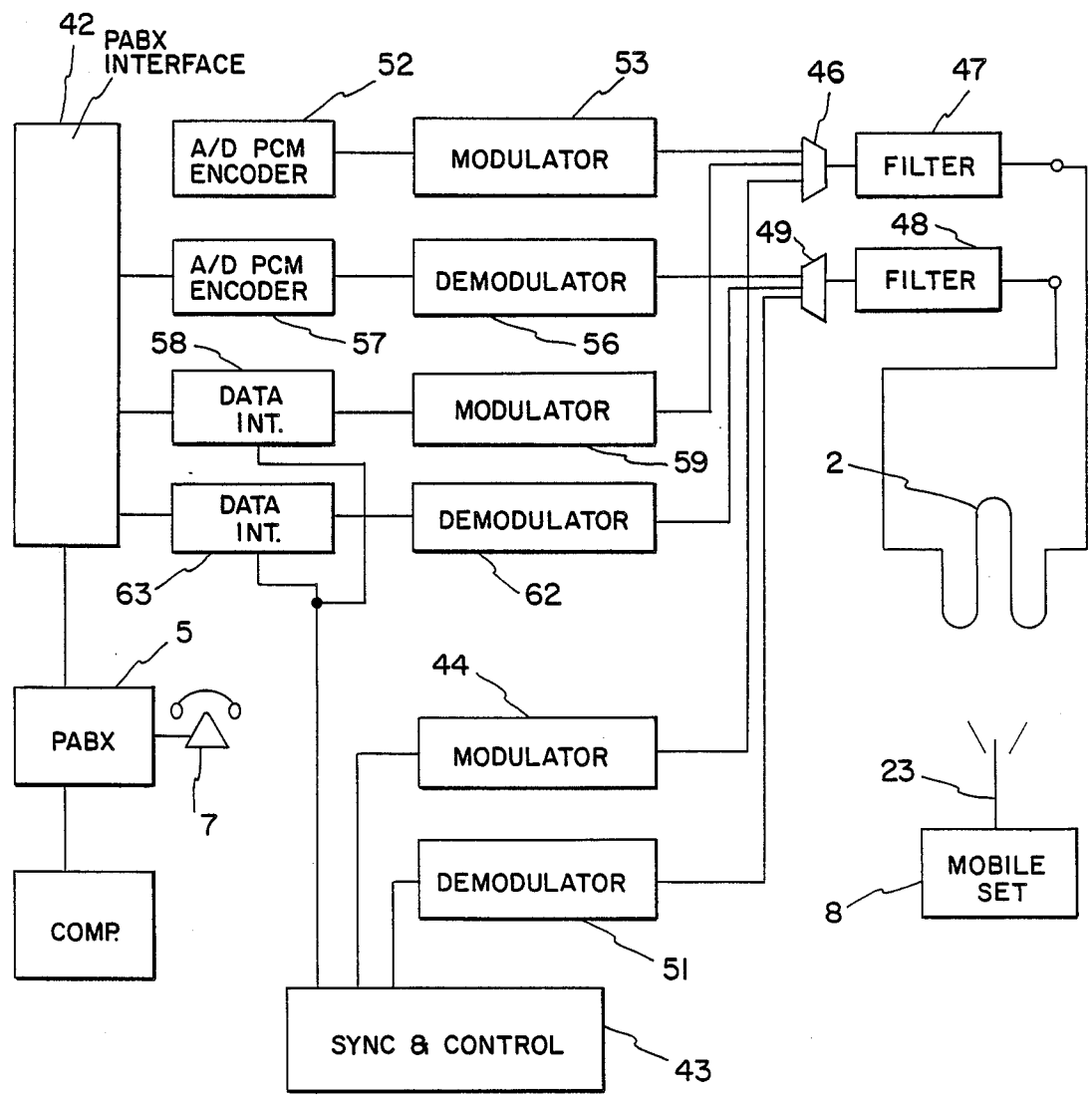

A better understanding of the invention will be obtained by reference to the detailed description below of the preferred embodiment, with reference to the following drawings:

FIG. 1 is a general block diagram of a system according to the present invention, FIG. 1A illustrates a code arrangement used in multiplexing the channels of the spectrum, FIG. 2 is a block diagram illustrating the mobile handset according to the preferred embodiment of the invention, FIG. 3 is a block diagram if the central equipment according to the preferred embodiment of the invention, and FIG. 4 is a block diagram of a preferred form of transmit channel used in the system.

To briefly review the spread spectrum concept, this technique causes the spectrum of the transmitted signal of each channel to be spread over a greater amount of bandwidth than would be the case if time or frequency division multiplexing techniques were used. Indeed, the signals of all of the channels used are spread over the same band. This is achieved by multiplying a generated data stream to be transmitted by a sequence with the correct auto-correlation and cross-correlation properties (pseudo-random/noise code sequence). The resulting output signal is then a sequence having a higher data rate than that of the input data stream, which when used to modulate some form of amplitude, frequency or phase shift keyed system, causes the spectrum to be spread over a wide bandwidth.

At the receiver the incoming signal is multiplied by the same pseudo-random/noise sequence and the spectrum becomes despread to its original bandwidth. It is important to note that any interfering signal is spread at the receiver rather than despread The signal is then filtered at the receiver to the original bandwidth, leaving the original signal intact but the interfering signal is attenuated and thus its effect is diminished. This occurs whether the interfering signal is a real signal or is a hole (i.e. null) in the spectrum generated by some propagation effect. Thus a spread spectrum system provides not only immunity against interfering signals but also protection against holes in the spectrum.

Because a large number of spread spectrum sequences are generally known, it is possible to choose a set for a system which would be very difficult to decode by an intruder or eavesdropper. The spread spectrum system therefore contains its own intrinsic security The interference to which the system is immune may of course be other channels of the system using the same spectrum. Spread spectrum is therefore intrinsically a multiplexing system. Different channels using the same bandwidth can be immune to each other if they use different spreading sequences for modulation and demodulation.

For example, for a pseudo random code having length 255 bits, there are probably approximately 40000 codes which are strongly orthogonal, and thus are highly secure. It is preferred in the present system to use a centre frequency of between about 150 mHz to 1000 mHz, although the invention is not limited to this band, each channel being approximately 32 kHz wide, in which the voice signals are digitized in a well known manner. The spread channel is preferred to be 8 mHz wide.

Turning now to FIG. 1, the basic system according to the invention is illustrated. Within the confines of a building periphery 1 a leaky cable 2 is laid. The leaky cable can be coaxial cable with holes in its shield, such as described in Canadian Pat. No. 1,014,245 issued July 19, 1977, or other types of leaky transmission cables as described in the aforenoted text by P. Delogne. The cable can be sinuously laid above the false ceiling over the entire width and breadth of the building, can extend down the centre of a narrow building, and can pass from storey to storey in a multi-storey building as well as extend over the ceiling area of a building. The leaky cable can be located within movable walls or within an electromagnetically transparent floor. Clearly the location of the cable is dependent on the region to be covered and many variations are possible. The important aspect of the placement of the cable is that for a given minimum electromagnetic field strength, the entire working area of the building which defines the communication region should be enveloped by the field strength leaked from the cable which is above the minimum level.

It will be seen that since the field strength drops off by between the square and the cube of the distance from the cable, the effective radiated power outside the building periphery will be low or virtually nil.

As central equipment, feeding the cable at one end is a transmitter 3, and receiving signals from the other end of the cable is a receiver 4. The input to the transmitter 3 is connected to a PABX 5 and the output of receiver 4 is connected to the PABX 5. Also connected to the PABX are trunks 6 and local telephone sets 7. Of course the PABX can be divided by number code so that groups of local telephone sets 7 can be associated with one business or division while other groups can be associated with another business or division, if desired.

One or a plurality of remote wireless mobile telephone sets 8 are located within the building. These telephone sets will be referred to herein henceforth as mobile sets and can include data originating and receiving terminals as well as, or in place of voice handsets. Mobile sets 8 preferably are battery operated, can be carried by a user, can be located on a desk, hung on a wall, etc. They are not connected by wire to the telephone system PABX.

Depending on the characteristics of the leaky cable 2, its length, etc., repeaters 9 may be required to be connected at regular intervals in series with the leaky cable. These repeaters are preferably wideband, such as CATV television repeaters.

The PABX 5 is primarily a normal PABX which operates to interconnect local telephone sets with each other or with trunks 6. In order to communicate with the mobile sets 8, one of the telephone sets 7 dials an appropriate extension number designating a mobile set. The PABX, instead of connecting the telephone set to one of the other sets 7, simply chooses a line terminal 10 which corresponds to the mobile sets 8, connected to a predetermined junctor. The selected line terminal connects to the input of transmitter 3. In one embodiment ringing current is applied to the line terminal in the normal manner. The transmitter 3 converts the ringing current to a predetermined digital code, interleaves it with other digital codes on a supervisory channel, converts the resulting signal to a spread spectrum supervisory channel signal and applies the resulting signal to the leaky cable 2.

The line terminal however designates which mobile set is to be selected, since it corresponds to the dialed number. Once the line terminal has been selected the transmitter prefixes the digital code with an identifier code which is unique to the mobile set. However it should be noted that rather than using line terminals, junctors of the PABX can be used. Also, instead of applying ringing current to the terminal it can apply a ringing enable signal to a ringing terminal associated with the line terminal.

The signal radiates from the leaky cable into the communication region within the building periphery 1, and is received by all of the sets 8. All of the mobile sets continuously decode the signalling signals, and as soon as the identifier prefix which identifies the designated set has been received, that the identified set converts the remaining code which calls for it to ring. Ringing is effected in the mobile set by keying an internal "warble" or other signal to alert the user in a well known manner.

The user upon hearing the ringing signal, switches his mobile set on, the equivalent of going off hook. That mobile set then generates an off-hook supervisory code which is converted to a spread spectrum R.F. signal in the signalling channel, and is transmitted via its own small local antenna to the leaky cable 2. Preferably the signal is sent within a time slot designated by the synchronization and control signals sent on the aforenoted supervisory channel. Polling and response of the mobile sets in sequence is preferred to be used in the supervisory channel.

The spread spectrum off-hook code is received by the leaky cable, and is carried to the input of receiver 4. Receiver 4 demodulates, despreads and decodes this signal and applies the off-hook supervisory signal to the line input port 11 of PABX 5 associated with terminal 11 (or to the associated junctor).

It should be noted that while two unidirectional ports 10 and 11 have been indicated, the transmitter and receiver can equally be connected to separate inputs of a hybrid which is connected to a bidirectional line or junctor.

The PABX 5, receiving the off hook supervisory signal as if it were from a telephone set, completes the connection between the calling party and mobile set via the transmitter 3 and receiver 4 as if it were to be connected to another telephone 7. The transmitter 3 and receiver 4 are associated with fixed voice channel transmit and receive pseudo-random spreading codes. When this occurs control apparatus associated with transmitter 3 and receiver 4 transmits on the supervisory channel a data signal addressed to the now off-hook mobile set 8 which designates the transmit and receive pseudo-random codes for the two-way voice channel to be used for voice communication to match those of the transmitter and receiver. The mobile set adopts the codes and thus can transmit and receive on the designated channel. Voice communication between the telephone set 7 and mobile set 8 now proceeds on the specified channel, while using the dedicated supervisory channel for supervisory signals.

When either of the sets goes on hook at the conclusion of the communication, the supervisory signal associated with that function is carried by the supervisory channel as described earlier during the set up of a call. The voice connection is then taken down in a manner analogous to setting up all supervisory and voice or data communication thus can proceed in this manner.

FIG. 1A illustrates the preferred form of channel assignments. Dedicated pseudo-random codes designate the supervisory channel in each direction, while a plurality of pseudo-random codes (e.g. up to approximately 40,000) can be used to designate the transmit and receive channels. All channels use essentially the same frequency band, though different bands are used in the centre to mobile and mobile to centre directions. None will be found to interfere with each other or with other wireless services using the same frequencies, except for random bit errors which will increase with traffic. In a typical system only about 32 two-way channels will be required although there is clearly capacity for many more, given the number of codes available.

In a similar manner calls can be made from any mobile set 8. All mobile sets 8 continuously receive and transmit information on the supervisory channel. Thus if a mobile set 8 goes off-hook this information is transmitted by the supervisory channel to receiver 4 where it is demodulated, despread and decoded before passing to PABX 5. On receiving the off-hook signal PABX 5 allocates a voice channel as described above, transmits dial tone to the mobile set 8, receives signalling information from mobile set 8 and sets up the call in the usual manner. The mobile sets 8 are clearly not limited to voice communications; they can be combination voice and data sets, or restricted to being data terminals. In this respect one of the trunks 6 of PABX 5 can be connected to a computer for receiving data from and transmitting data to a mobile data set 8. Alternatively a computer can be connected directly to the main bus of PABX 5 for communication with the mobile sets. In this manner the mobile set 8 can be used as a remote terminal to a central computer Low speed data communication can be effected with the mobile set 8 via the supervisory channel, or high speed via a dedicated data channel, or via a voice channel shared with and carrying data.

Block diagrams of the mobile set and central equipment constituting the transmitter and receiver are shown in FIGS. 2 and 3. The mobile set will be described first, with reference to FIG. 2.

An analog telephone set 15 to which a handset or handset with display 16 is connected and, if desired, a keypad 17 has an internal hybrid with an output line connected to an analog-to-digital PCM encoder 18. Preferably the encoder is an adaptive differential encoder of toll quality, e.g. it will encode a signal which is output at 32 kb/sec.

The output of encoder 18 is connected to the input of modulator 19, which both spread spectrum and RF modules the incoming signal. The output of modulator 19 is connected to the input of a combiner 21 which is connected through a transmit filter 22 and directional coupler 22A to an antenna 23.

The filter preferably is 8 megahertz wide, having a Q between 20 and 100. It can for example be a printed strip line controlled by varacter diodes such as is often found in the tuner of a TV set.

The antenna 23 is similarly connected through a directional coupler 23A to the input of the receive filter 24 (which is similar to filter 22) which is connected to the input of a splitter 25. One output of splitter 25 is connected to demodulator 27 which both spread spectrum and RF demodulates the signal. The output of demodulator 27 is connected to the input of digital-to-analog PCM decoder 28, the output of which is connected to the input line to telephone 15.

A data interface circuit 29 is also connected to telephone set 15, which contains data encoding and signalling circuitry as well as associated buffers. Considering only the signalling aspect for the moment, off-hook, on-hook, etc. and other signalling signals as are normally generated in a telephone set are applied via interface circuit 29 to a synchronization and control circuit 30. The synchronization and control circuit contains a master clock for the mobile set, and controls the filters 22 and 24. The clock signal used in the synchronization and control circuit is obtained from the incoming signal received via antenna 23.

A spread spectrum and RF modulator 31 has its input connected to synchronization and control circuit 30, and its output connected to another input of combiner 21. The output of RF modulator 38 is connected to another input of combiner 21.

A second output of splitter 25 is connected to an input of demodulator 34, which has its output connected to synchronization and control circuit 30.

A voltage controlled oscillator circuit 35 is connected to the synchronization and control circuit 30, and has outputs connected to modulators 19, 31 and 38 and demodulators 27, 34 and 41.

Synchronization and control circuit 30 also has outputs connected to modulators 19, 31 and 38 and demodulators 27, 34 and 41.

In operation, according to the preferred embodiment of the invention the pseudo-random codes designating the transmit and receive supervisory channels are fixed by means of code plugs or other similar code designating means, fixed in modulator 31 and demodulator 34. A supervisory signal having a spreading code correlatable by the correlation code in demodulator 34 is received from the leaky cable transmission line 2 (FIG. 1) by antenna 23. The signal passes through directional coupler 22A, is filtered in filter 24, passes through splitter 25 and into demodulators 27 and 34. However since demodulator 27 will not recognize the encoded signal, it outputs only a low level random noise signal. However since spread spectrum modulator 34 does recognize the supervisory channel code, it decodes the signal and applies it to synchronization and control circuit 30. Synchronization and control circuit 30 recognizes a data header designating the local mobile set and further recognizes the demodulated code as meaning that ringing should start. It applies a signal to telephone controller 15, which begins ringing. If the local mobile set data header was not recognized, the ringing function would not be enabled.

It should be noted that on the supervisory channel the code which is received can designate any supervisory function or indeed can carry low speed data communication signals. In this respect it is preferred that the signal carried on this channel should contain four 8 bit words in sequence: the first 8 bits designating the station number of the mobile set, and second 8 bits designating what function should be performed, the third 8 bits should contain bits to enable error detection and correction, and the fourth group of 8 bits should contain a synchronization pattern.

With the local telephone set going off-hook, telephone controller 15 applies an off-hook signal to synchronization and control circuit 30. Synchronization and control circuit 30 in turn generates a code sequence containing the local station address identifier, a supervisory code designating "off hook", error correction bits and a synchronization pattern and applies it to modulator 31. Modulator 31 modulates the signal using the fixed supervisory channel code and also RF modulates the signal applied to it before applying it to an input of combiner 21. The output signal of combiner 21 is applied through filter 22 and directional coupler 22A to antenna 23 from which it is transmitted to leaky cable transmission line 2.

A supervisory signal is also received from the central equipment in the same manner as noted above which designates which channel or channels the incoming and outgoing analog and/or data signals from and to the mobile set are to be transmitted. This channel designating signal is received by the synchronization and control circuit 30 over the supervisory channel. The synchronization and control circuit 30 upon receiving the channel designating signals applies signals to modulator 19 and demodulator 27 which control the pseudo-random spreading and correlating codes respectively. Once these codes have been established in the modulator and demodulator, subsequent signals will be transmitted on a spread spectrum channel designated by the modulation pseudo-random spreading code and received by the mobile set on a spread spectrum channel designated by the designated correlation.

For transmission of analog or analog and data signals from the local handset, such signals pass from handset 16 (and/or keypad 17) into telephone 15 in the usual manner, are split into unidirectional signals, e.g. in a hybrid, and the outgoing signals are applied to PCM encoder 18. The resulting digital output signals are applied to spread spectrum modulator 19, are modulated using the channel spreading code established therein as described above, and are applied to RF modulator 20. Under control of the synchronization and control circuit 30 modulator 20 modulates the signal, and the resulting RF modulated spread spectrum signal is applied via multiplexer 21 through filter 22 to antenna 23 for transmission to the leaky cable transmission line.

A signal received from leaky cable transmission line 2 by antenna 23 is applied through directional coupler 22A, filter 24, and splitter 25 to demodulators 27 and 34 which are controlled by synchronization and control circuit 30. The resulting demodulated and despread signal from demodulator 27 is applied to PCM decoder 28. The resulting analog output signal is applied to the incoming signal line of telephone 15 from where it is applied to handset 16. However since demodulator 34 will not recognize the pseudo random code used it will not apply any input to synchronization and control circuit 30.

In the above manner all of the supervisory functions of the mobile set can be received and transmitted, the analog signal receive and transmit channels established and the analog and low speed data transmitted and received.

It is preferred that when no radio frequency signals are being received, decoder 28 should be switched into a silence mode. A silence code generator 36 is connected to the output of demodulator 27. When the silence code generator 36 detects silence code at the output of demodulator 27, it applies a signal to decoder 28 which causes it to remain stable in a known state, whereby no analog output signal is generated.

Similarly, a silence detector 37 is connected to the outgoing signal line of telephone set 15 for detecting silence. The output of silence detector 37 is applied to synchronization and control circuit 30, which reduces or shuts off modulator 19 for that interval. This results in a reduced error rate of signals received by the central system and reproduced in the mobile set. The silence code detector 28 and silence detector 37 should be very fast acting so as to prevent the clipping of the start of words. Silence detectors have been used in TASI (time assignment speech interpolation) transmission systems.

In order to transmit and receive high speed data, data interface circuit 29 interfaces via telephone 15 to the display in the display and handset 16 and to the keypad 17, or to an external port (not shown) which may receive data from a local data collection machine or the like. The high speed data is applied through data interface 29 to modulator 38 of construction similar to that of modulator 19. The output of modulator 38 is connected to an input of combiner 21.

An output of splitter 25 is connected to an input of demodulator 41, which has its output connected to the incoming data port of data interface 29.

For reception and transmission of data, modulator 38 and demodulator 41 operate similarly to modulator 19 and demodulator 27 respectively. The modulator 38 and demodulator 41 are controlled upon receipt of a signal in the synchronization and control channel designating that data is to be received or transmitted, in a manner similar to that described earlier. Channels are designated by the allocation of pseudo-random codes as described earlier. The data can be transmitted using simple packets at 90.2 Kilobits per second, for example, the packets containing data signals and error correction codes.

Turning now to FIG. 3, the transmitter and receiver and PABX interface at the central equipment are illustrated. The elements in the transmitter and receiver referred to with respect to FIG. 1 will become evident by the description below and have not been segregated, for the purpose of clarity of explanation.

A PABX 5 includes a plurality of interface circuits 42, one of which is shown. Each interface circuit can be similar to a well known PABX line circuit except that it has an additional communication link with the main bus of the PABX for receiving synchronization pulses for transmission to the mobile set.

When a telephone set 7 wishes to communicate with a mobile set, for example, a subscriber will dial digits designative of the particular mobile set to be contacted. The PABX, in the normal manner, can select a line terminal or port which is unique to that mobile set. However use of the system in this manner would require as many line circuits or terminations as there are mobile sets. It is preferred, instead, to have the PABX select a particular junctor with a PABX interface connected thereto, with the mobile set to be selected designated by address or ground point. Use of the system in this preferred manner will require only as many interface circuits as the traffic requires, clearly a considerably fewer number of interfaces, circuits and channels than the number of mobile sets.

With the interface selected and either a line termination enabled or a data code received from the PABX which designates the mobile set to be rung, a sync and control circuit 43 receives both the supervisory signal and designation of the mobile set to be contacted from the PABX via the PABX interface. The sync and control circuit 43 formulates a data packet comprised of the station number, supervisory signal, error correction and synchronization pattern bits and transmits it to a modulator 44. Modulator 44 has a dedicated pseudo-random spreading code fixed to the supervisory channel. The modulator 44 spread spectrum and RF modulates the supervisory signal (which in this case contains a supervisory sequence which indicates that a particular mobile set should be rung). The modulated output signal therefrom is applied to multiplexer 46 from which it is passed to 8 megahertz filter 47, which is similar to filter 22. The output signal of filter 47 is applied to one end of leaky transmission cable 2. The signal passes along transmission cable 2, radiating as described earlier. The radiated signal is received by mobile set 8 in the manner described above.

A signal received from the mobile set 8 passes through 8 megahertz filter 48 (which is similar to filter 47) and splitter 49 and demodulator 51. Since the supervisory signal is on a fixed channel, the pseudo-random correlation code for demodulator 51 is fixed, and the received signal is demodulated resulting in a data signal applied to sync and control circuit 43 which constitutes the return supervisory signal (e.g. an off hook indication) from mobile set 8. Sync and control circuit 43 applies this signal to PABX interface 42 which applies it in recognizable form to PABX 5.

Sync and control circuit 43 also has outputs connected to modulators 44, 53 and 59 and demodulators 51, 56 and 62 for applying a synchronization and control signals thereto.

Since a particular junctor, and thus PABX interface 42 was selected by the PABX for the forthcoming communication, the particular outgoing and incoming channels are thereby designated, and a mark signal related to the particular channels is applied to sync and control circuit 43. Sync and control circuit 43 contains a table of pseudo-random codes corresponding to the selected spread spectrum modulator and demodulator, and another table of mobile set station numbers corresponding to the mark signal (which identifies the caller mobile station uniquely. A supervisory signal is formulated in sync and control circuit 43, which is sent to the selected mobile set 8 identified by station number, advising it what spread spectrum channel to tune itself to.

The supervisory signal can send to the mobile set one of two kinds of signals: a signal advising the mobile set to establish its receive and transmit spread spectrum modulator and demodulator pseudo-random codes to codes stored in a table in each mobile set, i.e. identifying the codes by number. Alternatively the sync and control circuit can transmit the actual pseudo-random codes to the selected mobile set 8 to enable it to set its modulator and demodulator to the designated spread spectrum channels In this manner, in a 200 mobile set system, typically 32 junctors and thus 32 PABX interfaces can be used, rather than 200 interfaces would be required if each line circuit were separately interfaced. However the present invention contemplates the use of individual line circuits for each two-way channel if economics dictate.

Since a particular junctor, and thus a particular PABX interface circuit 42 has been selected by the PABX in the normal manner to carry the communication, the outgoing and incoming channels are also fixed as noted above. The output signal from the PABX interface circuit is applied to analog digital PCM encoder 52. The resulting encoded output signal is applied to the input of modulator 53 which has a dedicated pseudo-random code related to that particular channel. The RF modulated output signal is applied to an input of combiner 46, from which it passes through filter 47 and is applied to the leaky cable 2. Since the spread spectrum modulation codes in modulator 53 and modulator 44 are different, there will be no interference between the two signals. The signal applied to leaky cable 2 is radiated for reception by mobile sets 8 as described earlier.

A received signal from the leaky cable 2 transmitted by mobile set 8 passes through filter 48 and combiner 49, is demodulated and despread in demodulator 56, and the resulting signal is passed to analog PCM decoder 57. The resulting output signal is applied to PABX interface 42 for application to the junctor of PABX 5. Since the spread spectrum pseudo-random spreading code at the mobile set for signals transmitted thereat under control of sync and control circuit 43, were designated by the selection of a particular junctor and PABX interface circuit 42 by normal operation of the PABX, which is identical to that pseudo-random code in spread spectrum demodulator 56, the signal received from mobile set 8 is properly decoded in demodulator 56, but is rejected by demodulator 51.

The PABX interface can also interface to high speed data junctors, or to a data bus in the PABX which designates by code which mobile set is to be communicated with. Either by junctor selection as described above or by decoded selection from the PABX data bus, the high speed data signal is applied to outgoing data interface circuit 58. The output signal is applied to modulator 59, in a manner analogous to that described earlier. The RF modulated signal is applied to an input of combiner 46, passes through filter 47 and is applied to the leaky cable 2.

Received high speed data signals from mobile set 8 are received by leaky cable 2 and pass through filter 48, splitter 49 and are applied to demodulator 62. The resulting data output signal after spread spectrum and RF demodulation is applied to data interface circuit 63, from which the data signal is applied to the junctor or data bus of the PABX through PABX interface circuit 42. The data channel selection at the mobile set 8 is established as the incoming and outgoing data channels in a manner analogous to that described above for the outgoing and incoming analog channel.

It is preferred that a silence detector and a silence code detector should be used in each of the incoming and outgoing analog channels of the central equipment (not shown) which are similar to those described with reference to FIG. 2 and are similarly connected. The silence and silence code detectors should be very fast acting. Since the error rates of the signals which are received are dependent on the total number of channels sharing the same bandwidth, it is highly desirable to switch the RF or IF signals off or to extremely low level during silent periods. For a given error rate, the use of silence detectors will increase the number of channels which can share the same bandwidth at the same time. Synchronization will not be lost since the supervisory channel will always be operating and carries synchronization signals. Thus the receivers at the mobile sets and at the central equipment can always regain synchronization if it is lost.

When communication has been set up the mobile sets thus each will have two receive addresses, one which is a polling address which is used on the synchronization channel and the other which is the pseudo-random code, i.e. the correlation code that it is instructed to use via the supervisory channel. It will use two transmit addresses, one which designates it and allows it to be recognized in the supervisory receive channel at the central equipment and one a pseudo-random code which matches the analog or digital receive channel code at the central equipment. Thus the instruction to use a particular correlation code is similar to the designation to the mobile set to use a particular junctor, and is directly analogous to the junctor selected at the PABX. It can additionally have separate high speed data channel receive and transmit spreading and correlation code addresses.

The pulse code modulation scheme which is used is preferred to be adaptive differential PCM, a full description of which can be obtained in the draft recommendation G721 of CCITT. According to this specification PCM is transcoded from 64 Kilobits per second to 32 Kilobits per second. It is also preferred that the pseudo noise code sequence used in the spread spectrum modulator should be 255 bits, although it is expected that other sequence lengths could be used. It is also preferred that the RF modulation should be phase shift keyed, and can be minimum shift keyed, bandwidth phase shift keyed, QPSK or staggered phase shift keyed. It is also preferred that the data channels should transmit at 90.2 kilobits per second.

It should be noted that only one sync and supervisory channel modulator and demodulator 44 and 51 need be used for the entire system while the PABX interface and decoders, modulators and demodulators are duplicated for each channel. Of course apparatus used for the data, or for the analog channels need not be used if one or the other kind of communication is not to be provided for a particular junctor or for communication to the mobile sets in general.

Referring now to FIG. 4, the modulation portion of the transmitter is shown. An incoming PCM or data signal from encoder 52, for example, is carried on line 64 to a data circuit 65, in which the incoming signal is synchronized and speed adjusted. The outgoing signal from data circuit 65 is applied to an exclusive OR gate 66. A sequence generator 67 generates a pseudo-random code which is specific to the channel to be transmitted and applies its output to another input of exclusive OR gate 66. One complete pseudo-random code, of preferred length 255 bits, is Exclusively ORed with each data bit. The resulting PN sequence of exclusive OR gate 66 is applied to an input of data modulator 68. The data circuit 65, sequence generator 67 and exclusive OR gate 66 provides the spread spectrum modulation.

An intermediate frequency (IF) oscillator 69 generates a signal which is applied to data modulator 68, where it modulates the signal, resulting in a IF signal on line 70. The IF signal is applied to a summer 71, along with the IF signals of other data modulators, illustrated byline 71A. The output signal of summer 71 is applied to a mixer 72, to which is applied an RF carrier signal generated in a carrier generator 73. The carrier signal is mixed with the sum IF signal and the resulting RF modulated output signal of mixer 72 is applied to an 8 megahertz filter 74. The output filter of signal 74 is applied to leaky transmission line 2.

It is preferred that the data modulator should modulate the IF signal with the output of Exclusive OR gate 66 using phase shift modulation.

It will be noted that in the circuit of FIG. 4 the modulated signals have been summed prior to RF modulation in mixer 72. The summer 71 is of course equivalent to combiner 46. The IF signals can be summed prior to RF modulation as shown in FIG. 4, or the RF signals can be summed following RF modulation as shown in FIG. 3.

The receive channel is similar to FIG. 4 in that the mixer outputs to a splitter the IF signal in a well known manner and the resulting signal is applied to a data demodulator. The demodulator multiplies the incoming signal by an IF signal modulated by the same pseudo-random code used in the transmitter. The output of the demodulator is then low-pass filtered to recover the data.

While the circuit of FIG. 4 can be used in the transmit and receive channels of the central equipment shown in FIG. 3, the major different between that circuit and the circuit used in mobile set 8 is that the sequence generator can generate a selected code sequence in the latter. As noted earlier the sequence is established either by a look up table in the mobile set which is designated by the supervisory signal received from the central equipment or by reception of the actual sequence to be used. Of course the receive channel is directly analogous to the transmit channel.

Returning to the supervisory channel, during idle intervals it is preferred that the central equipment should transmit a 32 bit supervisory polling message to each mobile set in sequence and to wait for a response in the following 32 bit message. In case erroneous messages are received, it is preferred that a request for a repetition should be transmitted in the next supervisory sequence designated for the particular mobile set or the particular junctor channel time period. In the analog and data channels either repetition or error correction, or ignoring packets which have been designated as erroneous can be implemented. Since the supervisory channel operates by polling, transmission collisions are avoided.

Each of the elements described above can be implemented in dedicated logic to provide the functions described, or can be grouped and implemented in microprocessor-memory combinations operated using firmware written using the algorithms described herein.

Since radiation from a leaky transmission cable is used, extremely low powers can be used, e.g. ten milliwatts per channel. Clearly the power used in the mobile sets, typically operated by battery, is greatly economized.

Since spread spectrum is used in combination with the leaky cables, nulls which are usually encountered using leaky feeder systems, and signal dropout regions often encountered using fixed antenna radiators are substantially avoided. Since there is a fast drop off of signal level with distance from the leaky cable radiator, the judicious placement of leaky cable in the ceiling or other peripheral region of the building will establish detectable power levels throughout the building, but virtually undetectable RF signals outside of the environs of the building. Thus the system is highly localized, minimizing any interference with any other kinds of systems.

Further, because the system is spread spectrum, it is inherently private, which is highly unusual in a wireless telephone system. It is economical of spectrum space, since substantially the same bandwidth is used for all channels. With the very low level of power which is used, and each channel being spread over a wide bandwidth, the actual transmitted signal appears to be little more than very low level noise to conventional wireless systems. Yet because there are such a great number of pseudo random codes which can be used, the possibility of interference between channels, or of interception outside of the present system is rendered almost nil.

The system can be used for conventional analog voice communication, as noted earlier, or in addition or in alternative the mobile set can be a hand held computer terminal. However since each mobile set can transmit on either a designated or centrally controlled secure channel, the mobile set can also be used for remote control of apparatus such as automatic doors, various building services, etc. with high security. For example it can control robots, domestic appliances, etc. The mobile set is thus a highly versatile unit used in conjunction with the system described above.

It should also be noted that while the modulators and demodulators at the central equipment have fixed pseudo random codes and those at the mobile sets have codes which are variable, in an alternative system the codes at the mobile sets can be fixed, and the codes at the central equipment can be varied to select a channel corresponding to the designated mobile set. However in this case the number of variable pseudo-random cOdes which are used will correspond to twice the number of mobile sets (two one-way channels to each mobile set), plus two for supervisory while in the case in which the mobile sets change their correlation codes, the number of correlation codes used will correspond to twice the number of junctors or total channels expected to be used for communication (plus two for supervisory), a far fewer number.

Further, the central apparatus described herein could usefully be employed to operate with one or a group of distributed antennae, rather than, or in addition to, the leaky cable. Such a structure would find great utility in buildings or outdoor areas in which it is not feasible to wire telephone system connected by wires, or to deploy a leaky cable.

A person understanding this invention may now conceive of various alternative structures using the principles described herein. All are considered to be within the scope of the invention as defined in the claims appended hereto.

We claim:

1. A wireless system for telephone communication within a building comprising:
   (a) means at a central location for receiving a plurality of signals for communication with selected wireless communication terminals,
   (b) means at said central location for converting said signals to spread spectrum radio frequency signals using correlation codes corresponding to particular idle channels,
   (c) a leaky transmission line located in a communication region within the building,
   (d) means for applying said spread spectrum radio frequency signals to said transmission line for electromagnetic radiation within said region,
   (e) at least one mobile wireless communication terminal adapted to receive a predetermined one of the spread spectrum radio frequency signals within the building and for demodulating it into an intelligible signal, and
   (f) a plurality of similar circuits each comprising an interface means at the central location for connection to an individual junctor of a PABX, for receiving and transmitting communication signals from said junctor and for receiving and transmitting communication signals from said junctor and for receiving and transmitting supervisory signal from the PABX relating to a telephone call, a central PCM encoder connected to the interface means for receiving signal to be transmitted to a wireless communication terminal, a modulator using a fixed pseudo-random correlation code associated with the junctor for spread spectrum modulating the encoded signal and generating an RF modulated signal, means for applying the latter RF modulated signal through a transmit band limiting filter to the leaky transmission line, means for receiving an RF modulated signal from the leaky transmission line through a receive band limiting filter, a central RF demodulator for demodulating and despreading a received RF modulated signal using a fixed pseudo-random correlation code associated with said junctor for demodulating the latter signal, a PCM decoder for receiving a spread spectrum demodulated signal and applying it to the interface means for application to said junctor, a central synchronization and control circuit connected to all said interface means for receiving supervisory signal from the junctors and/or a bus of the PABX and for formulating polling and supervisory signal of predetermined format received from the wireless communication terminal corresponding thereto and for translating poll messages and supervisory signal of predefined format to supervisory signal and for applying the latter signal to the junctors and/or bus of the PABX, a supervisory channel spread spectrum modulator using a predetermined supervisory channel correlation code for receiving and spread spectrum modulating said formulated polling and supervisory signal, RF modulating the latter signal and applying the RF modulated signal via the transmit band limiting filter to the leaky transmission line, a supervisory channel demodulator connected to the output of the receive band limiting filter for RF demodulating and despreading a received signal and applying received poll and supervisory signals to the synchronization and control circuit.

2. A system as defined in claim 1 including means for transmitting a supervisory signal on a fixed spread spectrum supervisory channel to said wireless communication terminal, means at said terminal for receiving a predetermined form of said supervisory signal designative of a particular correlation code related to a receive channel, and means for correlating the predetermined one of the spread spectrum signals using the correlation code to effect said demodulation into said intelligible signal.

3. A system as defined in claim 1 including means at the central location for receiving a signal at a particular port designative of a particular junctor or channel of an incoming signal, and means for transmitting said spread spectrum supervisory signal to said wireless terminal containing said predetermined form of said supervisory signal designative of said particular correlation code corresponding to said particular junctor or channel.

4. A system as defined in claim 1 including means at the central location for transmitting said spread spectrum communication signals to the wireless communication terminals using pseudo-random spreading codes which correspond to predetermined fixed correlation codes associated with individual ones of the wireless communication terminals.

5. A system as defined in claim 1, in which each wireless communication terminals is comprised of:
(i) a telephone set,
(ii) means for PCM encoding signals received from the telephone set,
(iii) means for spread spectrum and RF modulating the PCM encoded signals using a first pseudo-random correlation code,
(iv) means for applying the RF modulated signals to an antenna through a first filter for wireless transmission to the leaky transmission line,
(v) means for receiving RF and spread spectrum modulated signals from the antenna via a second filter,
(vi) means for receiving RF and spread spectrum demodulating the received signals using a second pseudo-random correlation code different from the first correlation code,
(vii) means for PCM decoding the spread spectrum demodulated signals,
(viii) means for applying the PCM decoded signals to the telephone,
whereby wireless two-way communication via said leaky transmission line on channels designated by the correlation codes is provided.

6. A system as defined in claim 5 in which the first and second correlation codes are variable, and means for causing variation thereof whereby particular designated send and receive spread spectrum channels are established.

7. A system as defined in claim 6 including a synchronization and control circuit, a second demodulator having its input connected to the output of said second filter for receiving a supervisory signal including synchronization signals, and providing demodulated digital supervisory signals therefrom to the synchronization and control circuit, the second demodulator using a fixed predetermined correlation code for demodulation of the supervisory signals, a second modulator having its input connected to the synchronization and control circuit for receiving supervisory signals and spread spectrum modulating said latter signals using a fixed predetermined pseudo-random code different from that of the correlation code used in the first modulator, RF modulating these signals and applying the signals via the second filter to the antenna, and means in the synchronization and control circuit for receiving supervisory signals from the telephone, generating supervisory data signals of predefined format and applying them to the second modulator, and for receiving supervisory data signals of predefined format from the second demodulator, for translating said latter supervisory signals therefrom and applying said translated signals to the telephone.

8. A system as defined in claim 7 including means at the synchronization and control circuit for deriving designated correlation codes from the received supervisory signals of predefined format and for enabling the first modulator and demodulator to use said latter correlation codes in modulation and demodulation respectively to establish the receive and transmit channels for said signals.

9. A system as defined in claim 8 including means for generating and displaying data at said wireless communication terminal, a data interface circuit connected to said data generating and displaying means, third means for spread spectrum and RF modulating data signals received via said interface circuit and applying the RF modulated signals to the first filter for transmission via the antenna to the leaky transmission line, third demodulation means having its input connected to the antenna via the second filter, and its output connected to the data interface circuit for applying demodulated data signals thereto, and means connecting the third modulator and demodulator to the synchronization and control circuit for carrying signals therefrom designative of the pseudo-random correlation codes to be used by the third modulator and demodulator.

10. A wireless communication system comprising:
(a) means at a central location for receiving a plurality of signals for communication with selected wireless communication terminals,
(b) means at said central location for converting said signals to spread spectrum radio frequency signals using correlation codes corresponding to particular idle channels,
(c) a leaky transmission line located in a communication region within the building,
(d) means for applying said spread spectrum radio frequency signals to said transmission line for electromagnetic radiation within said region,
(e) at least one wireless communication terminal adapted to receive a predetermined one of the spread spectrum radio frequency signals and for demodulating it into an intelligible signal, and (f) a plurality of similar circuits each comprising an interface means at the central location for connection to an individual junctor of a PABX, for receiving and transmitting communication signals from said junctor and for receiving and transmitting supervisory signals from the PABX relating to a telephone call, a central PCM encoder connected to the interface means for receiving signals to be transmitted to a wireless communication terminal, a modulator using a fixed pseudo-random correlation code associated with the junctor for spread spectrum modulating the encoded signal and generating an RF modulated signal, means for applying the latter RF modulated signal through a transmit band limiting filter to the leaky transmission line, means for receiving an RF modulated signal from the leaky transmission line through a receive band limiting filter, a central demodulator for demodulating and despreading a received RF modulated signal using a fixed pseudo-random correlation code associated with said junctor for demodulating the latter signal, a PCM decoder for receiving a spread spectrum demodulated signal and applying it to the interface means for application to said junctor, a central synchronization and control circuit connected to all said interface means for receiving supervisory signals from the junctors and/or a bus of the PABX and for formulating polling and supervisory signals of predefined format corresponding thereto and for translating poll messages and supervisory signals of predefined format to supervisory signals and for applying the latter signals to the junctors and/or bus of a the PABX, a supervisory channel correlation code for receiving and spread spectrum modulating said formulated polling and supervisory signals, RF modulating the latter signal and applying the RF modulated signal via the transmit band limiting filter to the leaky transmission line, a supervisory channel demodulator connected to the output of the receive band limiting filter for RF demodulating and despreading a received signal and applying received poll and supervisory signals to the synchronization and control circuit, a plurality of unidirectional repeaters connected serially at spaced locations in the leaky transmission line whereby an input and an output to the line are defined, the transmit filter being connected to the input of the transmission line and the receive filter being connected to the output of the transmission line.

11. A system as defined in claim 10, in which each wireless communication terminal is comprised of:
(i) a telephone set,
(ii) means for PCM encoding signals received from the telephone set,
(iii) means for spread spectrum and RF modulating the PCM encoded signals using a first pseudo-random correlation code,
(iv) means for applying the RF modulated signals to an antenna through a first filter for wireless transmission to the leaky transmission line,
(v) means for RF and spread spectrum modulated signals from the antenna via a second filter,
(vi) means for RF and spread spectrum demodulating the received signals using a second pseudo-random correlation code different from the first correlation code,
(vii) means for PCM decoding the spread spectrum demodulated signals,
(viii) means for applying the PCM decoded signals to the telephone,
whereby wireless two-way communication via said leaky transmission line on channels designated by the correlation codes is provided.

12. A system as defined in claim 11 in which the first and second correlation codes are variable, and means for causing variation thereof whereby particular designated send and receive spread spectrum channels are established.

13. A system as defined in claim 12 including a synchronization and control circuit, a second demodulator having its input connected to the output of said second filter for receiving a supervisory signal including synchronization signals, and providing demodulated digital supervisory signals therefrom to the synchronization and control circuit, the second demodulator using a fixed predetermined correlation code for demodulation of the supervisory signals, a second modulator having its input connected to the synchronization and control circuit for receiving supervisory signals and spread spectrum modulating said latter signals using a fixed predetermined pseudo-random code different from that of the correlation code used in the first modulator, RF modulating these signals and applying the signals via the second filter to the antenna, and means in the synchronization and control circuit for receiving supervisory signals from the telephone, generating supervisory data signals of predefined format and applying them to the second modulator, and for receiving supervisory data signals of predefined format from the second demodulator, for translating said latter supervisory signals therefrom and applying said translated signals to the telephone.

14. A system as defined in claim 13 including means at the synchronization and control circuit for deriving designated correleation codes from the received supervisory signals of predefined format and for enabling the first modulator and demodulator to use said latter correlation codes in modulation and demodulation respectively to establish the receive and transmit channels for said signals.

15. A system as defined in claim 14 including means for generating and displaying data at said wireless communication terminal, a data interface circuit connected to said data generating and displaying means, third means for spread spectrum and RF modulating data signals received via said interface circuit and applying the RF modulated signals to the first filter for transmission via the antenna to the leaky transmission line, third demodulation means having its input connected to the antenna via the second filter, and its output connected to the data interface circuit for applying demodulated data signals thereto, and means connected the third modulator and demodulator to the synchronization and control circuit for carrying signals therefrom designative of the pseudo-random correlation codes to be used by the third modulator and demodulator.

16. A wireless communication system comprising:
(a) means at a central location for receiving a plurality of signals for communication with selected wireless communication terminals,
(b) means at said central location for converting said signals to spread spectrum radio frequency signals using correlation codes corresponding to particular idle channels, (c) a leaky transmission line located in a communication region within the building, (d) means for applying said spread spectrum radio frequency signals to said transmission line for electromagnetic radiation within said region, (e) at least one mobile wireless communication terminal adapted to receive a predetermined one of the spread spectrum radio frequency signals and for demodulating it into an intelligible signal, and (f) a plurality of similar circuits each comprising an interface means at the central location for connection to an individual junctor of a PABX, for receiving and transmitting communication signals from said junctor and for receiving and transmitting supervisory signals from the PABX relating to a telephone call, a central PCM encoder connected to the interface means for receiving signals to be transmitted to a wireless communication terminal, a modulator using a fixed pseudo-random correlation code associated with the junctor for spread spectrum modulating the encoded signal and generating an RF modulated signal, means for applying the latter RF modulated signal through a transmit band limiting filter to the leaky transmission line, means for receiving an RF modulated signal from the leaky transmission line through a receive band limiting filter, a central demodulator for demodulating and despreading a received RF modulated signal using a fixed pseudo-random correlation code associated with said junctor for demodulating the latter signal, a PCM decoder for receiving a spread spectrum demodulated signal and applying it to the interface means for application to said junctor, a data interface circuit connected to the former interface circuit for receiving and transmitting data signals from and to the associated junctor and/or data bus of the PABX, a data channel modulator having a fixed correlation code corresponding to the junctor connected to the data interface circuit for spread spectrum and RF modulating a data signal received therefrom and applying the RF modulating signal via the transmit filter to the leaky transmission line, a data channel demodulator having its input connected via the receiver filter to the leaky transmission line, and for applying a data signal to the data interface circuit for transmission to the junctor or PABX data bus, a central synchronization and control circuit connected to all said interface means for receiving supervisory signals from the junctors and/or bus of the PABX and for formulating polling and supervisory signals of predefined format received from the wireless communication terminal corresponding thereto and for translating poll messages and supervisory signals of predefined format to supervisory signals and for applying the latter signals to the junctors and/or bus of the PABX, a supervisory channel modulator using a predetermined supervisory channel correlation code for receiving and spread spectrum modulating said formulated polling and supervisory signals, RF modulating the latter signal and applying the RF modulated signal via the transmit band limiting filter to the leaky transmission line, a supervisory channel demodulator connected to the output of the receive band limiting filter for RF demodulating and despreading a received signal and applying received poll and supervisory signals to the synchronization and control circuit.

17. A wireless communication system comprising:

(a) means at a central location for receiving a plurality of signals for communication with selected wireless communication terminals, (b) means at said central location for converting said signals to spread spectrum radio frequency signals using correlation codes corresponding to particular idle channels, (c) a leaky transmission line located in a communication region within the building, (d) means for applying said spread spectrum radio frequency signals to said transmission line for electromagnetic radiation within said region, (e) at least one wireless communication terminal adapted to receive a predetermined one of the spread spectrum radio frequency signals and for demodulating it into an intelligible signal, and (f) a plurality of similar circuits each comprising an interface means at the central location for connection to an individual junctor of a PABX, for receiving and transmitting communication signals from said junctor and for receiving and transmitting supervisory signals from the PABX relating to a telephone call, a central PCM encoder connected to the interface means for receiving signals to be transmitted to a wireless communication terminal, a modulator using a fixed pseudo-random correlation code associated with the junctor for spread spectrum modulating the encoded signal and generating an RF modulated signal, means for applying the latter RF modulated signal through a transmit band limiting filter to the leaky transmission line, means for receiving an RF modulated signal from the leaky transmission line through a receive band limiting filter, a central demodulator for demodulating and despreading a received RF modulated signal using a fixed pseudo-random correlation code associated with said junctor for demodulating the latter signal, a PCM decoder for receiving a spread spectrum demodulated signal and applying it to the interface means for application to said junctor, a central synchronization and control circuit connected to all said interface means for receiving supervisory signals from the junctors and/or a bus of the PABX and for formulating polling and supervisory signals of predetermined format corresponding thereto and for translating poll messages and supervisory signals of predefined format to supervisory signals and for applying the latter signals to the junctors and/or bus of a the PABX, a supervisory channel correlation code for receiving and spread spectrum modulating said formulated polling and supervisory signals, RF modulating the latter signal and applying the RF modulated signal via the transmit band limiting filter to the leaky transmission line, a supervisory channel RF demodulator connected to the output of the receive band demodulator connected to the output of the receive bank limiting filter for RF demodulating and despreading a received signal and applying received poll and supervisory signals to the synchronization and control circuit, a plurality of unidirectional repeaters connected serially at spaced locations in the leaky transmission line whereby an input and an output to the line are defined, the transmit filter being connected to the input of the transmission line and the receive filter being connected to the output of the transmission line, the frequency of the R.F. modulated signals being between approximately 150 MHz and 1000 MHZ.

18. A wireless communication system comprising:
(a) means at a central location for receiving a plurality of signals for communication with selected wireless communication terminals,
(b) means at said central location for converting said signals to spread spectrum radio frequency signals using correlation codes corresponding to particular idle channels,
(c) a leaky transmission line located in a communication region within the building,
(d) means for applying said spread spectrum radio frequency signals to said transmission line for electromagnetic radiation within said region,
(e) at least one mobile wireless communication terminal adapted to receive a predetermined one of the spread spectrum radio frequency signals and for demodulating it into an intelligible signal, and
(f) a plurality of similar circuits each comprising an interface means at the central location for connection to an individual junctor of a PABX, for receiving and transmitting communication signals from said junctor and for receiving and transmitting supervisory signals from the PABX relating to a telephone call, a central PCM encoder connected to the interface means for receiving signals to be transmitted to a wireless communication terminal, a modulator using a fixed pseudo-random correlation code associated with the junctor for spread spectrum modulating the encoded signal and generating an RF modulated signal, means for applying the latter RF modulated signal through a transmit band limiting filter to the leaky transmission line, means for receiving an RF modulated signal from the leaky transmission line through a receive band limiting filter, a central demodulator for demodulating and despreading a received RF modulated signal using a fixed pseudo-random correlation code associated with said junctor for demodulating the latter signal, a PCM decoder for receiving a spread spectrum demodulated signal and applying it to the interface means for application to said junctor, a central synchronization and control circuit connected to all said interface means for receiving supervisory signals from the junctors and/or a bus of the PABX and for formulating polling and supervisory signals of predetermined format corresponding thereto and for translating poll messages and supervisory signals of predefined format to supervisory signals and for applying the latter signals to the junctors and/or bus of a the PABX, a supervisory channel correlation code for receiving and spread spectrum modulating said formulated polling and supervisory signals, RF modulating the latter signal and applying the RF modulated signal via the transmit band limiting filter to the leaky transmission line, a supervisory channel demodulator connected to the output of the receive band limiting filter for RF demodulating and despreading a received signal and applying received poll and supervisory signals to the synchronization and control circuit, a plurality of unidirectional repeaters connected serially at spaced locations in the leaky transmission line whereby an input and an output to the line are defined, the transmit filter being connected to the input of the transmission line and the receive filter being connected to the output of the transmission line, the frequency of the RF modulated signals being between approximately 150 MHz and 1000 MHZ, the transmission line being coaxial cable having a shield containing gaps sufficient to allow RF energy radiation therefrom.

19. A wireless communication system comprising:
(a) means at a central location for receiving a plurality of signals for communication with selected wireless communication terminals,
(b) means at said central location for converting said signals to spread spectrum radio frequency signals using correlation codes corresponding to particular idle channels,
(c) a leaky transmission line located in a communication region within the building,
(d) means for applying said spread spectrum radio frequency signals to said transmission line for electromagnetic radiation within said region,
(e) at least one mobile wireless communication terminal adapted to receive a predetermined one of the spread spectrum radio frequency signals within the building and for demodulating it into an intelligible signal, and
(f) a plurality of similar circuits each comprising an interface means at the central location for connection to an individual junctor of a PABX, for receiving and transmitting communication signals from said junctor and for receiving and transmitting supervisory signals from the PABX relating to a telephone call, a central PCM encoder connected to the interface means for receiving signals to be transmitted to a wireless communication terminal, a modulator using a fixed pseudo-random correlation code associated with the junctor for spread spectrum modulating the encoded signal and generating an RF modulated signal, means for applying the latter RF modulated signal through a transmit band limiting filter to the leaky transmission line, means for receiving an RF modulated signal from the leaky transmission line through a receive band limiting filter, a central demodulator for demodulating and despreading a received RF modulated signal using a fixed pseudo-random correlation code associated with said junctor for demodulating the latter signal, a PCM decoder for receiving a spread spectrum demodulated signal and applying it to the interface means for application to said junctor, a data interface circuit connected to the former interface circuit for receiving and transmitting data signals from and to the associated junctor and/or data bus of the PABX, a data channel spectrum modulator having a fixed correlation code corresponding to the junctor connected to the data interface circuit for spread spectrum and RF modulating a data signal received therefrom and applying the RF modulated signal via the receive band limiting filter to the leaky transmission line, a data channel demodulator having its input connected via the receive band limiting filter to the leaky transmission line and for applying a data signal to the data interface circuit for transmission to the junctor or PABX data bus, a central synchronization and control circuit connected to all said interface means for receiving supervisory signals from the junctors and/or a bus of the PABX and for formulating polling and supervisory signals of predefined format corresponding thereto and for translating poll messages and supervisory signals of predefined format to supervisory signals and for applying the latter signals to the junctors and/or bus of the PABX, a supervisory channel modulator using a predetermined supervisory channel correlation code for receiving and spread spectrum modulating said formulated polling and supervisory signals, RF modulating the latter signal and applying the RF modulated signal via the transmit band limiting filter to the leaky transmission line, a supervisory channel demodulator connected to the output of the receive band limiting filter for RF demodulating and despreading a received signal, and applying received poll and supervisory signals to the synchronization and control circuit, a plurality of unidirectional repeaters connected serially at spaced locations in the leaky transmission line whereby an input and an output to the line are defined, the output of the transmit band limiting filter being connected to the input of the transmission line and the input to the receive band limiting filter being connected to the output of the transmission line.

20. A system as defined in claim 19, in which each wireless communication terminal is comprised of:
(i) a telephone set,
(ii) means for PCM encoding signals received from the telephone set,
(iii) means for spread spectrum and RF modulating the PCM encoded signals using a first pseudo-random correlation code,
(iv) means for applying the RF modulated signals to an antenna through a first filter for wireless transmission to the leaky transmission line,
(v) means for receiving RF and spread spectrum modulated signals from the antenna via a second filter,
(vi) means for RF and spread spectrum demodulating the received signals using a second pseudo-random correlation code different from the first correlation code,
(vii) means for PCM decoding the spread spectrum demodulated signals,
(viii) means for applying the PCM decoded signals to the telephone,
whereby wireless two-way communication via said leaky transmission line on channels designated by the correlation codes is provided.

21. A system as defined in claim 20 in which the first and second correlation codes are variable, and means for causing variation thereof whereby particular designated send and receive spread spectrum channels are established.

22. A system as defined in claim 21 including a synchronization and control circuit, a second demodulator having its input connected to the output of said second filter for receiving a supervisory signal including synchronization signals, and providing demodulated digital supervisory signals therefrom to the synchronization and control circuit, the second demodulator using a fixed predetermined correlation code for demodulation of the supervisory signals, a second modulator having its input connected to the synchronization and control circuit for receiving supervisory signals and spread spectrum modulating said latter signals using a fixed predetermined pseudo-random code different from that of the correlation code used in the first modulator, RF modulating signals and applying the signals via the second filter to the antenna, and means in the synchronization and control circuit for receiving supervisory signals from the telephone, generating supervisory data signals of predefined format and applying them to the second modulator, and for receiving supervisory data signals of predefined format from the second demodulator, for translating said latter supervisory signals therefrom and applying said translated signals to the telephone.

23. A system as defined in claim 22 including means at the synchronization and control circuit for deriving designated correlation codes from the received supervisory signals of predefined format and for enabling the first modulator and demodulator to use said latter correlation codes in modulation and demodulation respectively to establish the receive and transmit channels for said signals.

24. A system as defined in claim 23 including means for generating and displaying data at said wireless communication terminal, a data interface circuit connected to said data generating and displaying means, third means for spread spectrum and RF modulating data signals received via said interface circuit and applying the RF modulated signals to the first filter for transmission via the antenna to the leaky transmission line, third demodulation means having its input connected to the antenna via the second filter, and its output connected to the data interface circuit for applying demodulated data signals thereto, and means connected the third modulator and demodulator to the synchronization and control circuit for carrying signals therefrom designative of the pseudo-random correlation codes to be used by the third modulator and demodulator.

25. A wireless communication system comprising:
(a) means at a central location for receiving a plurality of signals for communication with selected wireless communication terminals,
(b) means at said central location for converting said signals to spread spectrum radio frequency signals using correlation codes corresponding to particular idle channels,
(c) a leaky transmission line located in a communication region within the building,
(d) means for applying said spread spectrum radio frequency signals to said transmission line for electromagnetic radiation within said region,
(e) at least one mobile wireless communication terminal adapted to receive a predetermined one of the spread spectrum radio frequency signals within the building and for demodulating it into an intelligible signal, and
(f) a plurality of similar circuits each comprising an interface means at the central location for connection to an individual junctor of a PABX, for receiving and transmitting communication signals from said junctor and for receiving and transmitting supervisory signals from the PABX relating to a telephone call, a central PCM encoder connected to the interface means for receiving signals to be transmitted to a wireless communication terminal, a modulator using a fixed pseudo-random correlation code associated with the junctor for spread spectrum analog and generating an RF modulated signal, means for applying the latter RF modulated signal through a transmit band limiting filter to the leaky transmission line, means for receiving an RF modulated signal from the leaky transmission line through a receive band limiting filter, a central demodulator for demodulating and despreading a received RF modulated signal using a fixed pseudo-random correlation code associated with said junctor for demodulating the latter signal, a PCM decoder for receiving a spread spectrum demodulated signal and applying it to the interface means for application to said junctor, a data interface circuit connected to the former interface circuit for receiving and transmitting data signals from and to the associated junctor and/or data bus of the PABX, a data channel modulator having a fixed correlation code corresponding to the junctor connected to the data interface circuit for spread spectrum and RF modulating a data signal received therefrom and applying the RF modulated signal via the transmit filter to the leaky transmission line, a data channel demodulator having its input connected via the receive filter to the leaky transmission line and for applying a data signal to the data interface circuit for transmission to the junctor or PABX data bus, a central synchronization and control circuit connected to all said interface means for receiving supervisory signals from the junctors and/or a bus of the PABX and for formulating polling and supervisory signals of predefined format corresponding thereto and for translating poll messages and supervisory signals of predefined format to supervisory signals and for applying the latter signals to the junctors and/or bus of the PABX, a supervisory channel modulator using a predetermined supervisory channel correlation code for receiving and spread spectrum modulating said formulated polling and supervisory signals, RF modulating the latter signal and applying the RF modulated signal via the transmit band limiting filter to the leaky transmission line, a supervisory channel demodulator connected to the output of the receive band limiting filter for RF demodulating and despreading a received signal, and applying received poll and supervisory signals to the synchronization and control circuit, a plurality of unidirectional repeaters connected serially at spaced locations in the leaky transmission line whereby an input and an output to the line are defined, the output of the transmit band limiting filter being connected to the input of the transmission line and the input to the receive filter being connected to the output of the transmission line, the frequency of the R.F. modulated signals being between approximately 150 MHz and 1000 MHz.

26. A wireless communication system comprising:
(a) means at a central location for receiving a plurality of signals for communication with selected wireless communication terminals,
(b) means at said central location for converting said signals to spread spectrum radio frequency signals using correlation codes corresponding to particular idle channels,
(c) a leaky transmission line located in a communication region within the building,
(d) means for applying said spread spectrum radio frequency signals to said transmission line for electromagnetic radiation within said region,
(e) at least one mobile wireless communication terminal adapted to receive a predetermined one of the spread spectrum radio frequency signals within the building and for demodulating it into an intelligible signal, and
(f) a plurality of similar circuits each comprising an interface means at the central location for connection to an individual junctor of a PABX, for receiving and transmitting communication signals from said junctor and for receiving and transmitting supervisory signals from the PABX relating to a telephone call, a central PCM encoder connected to the interface means for receiving signals to be transmitted to a wireless communication terminal, a modulator using a fixed pseudo-random correlation code associated with the junctor for spread spectrum modulating the encoded signal and generating an RF modulated signal, means for applying the latter RF modulated signal through a transmit band limiting filter to the leaky transmission line, means for receiving an RF modulated signal from the leaky transmission line through a receive band limiting filter, a central demodulator for demodulating and despreading a received RF modulated signal using a fixed pseudo-random correlation code associated with said junctor for demodulating the latter signal, a PCM decoder for receiving a spread spectrum demodulated signal and applying it to the interface means for application to said junctor, a data interface circuit connected to the former interface circuit for receiving and transmitting data signals from and to the associated junctor and/or data bus of the PABX, a data channel spectrum modulator having a fixed correlation code corresponding to the junctor connected to the data interface circuit for spread spectrum and RF modulating a data signal received therefrom and applying the RF modulated signal via the transmit filter to the leaky transmission line, a data channel demodulator having its input connected via the receive filter to the leaky transmission line and for applying a data signal to the data interface circuit for transmission to the junctor or PABX data bus, a central synchronization and control circuit connected to all said interface means for receiving supervisory signals from the junctors and/or a bus of the PABX and for formulating polling and supervisory signals of predefined format corresponding thereto and for translating poll messages and supervisory signals of predefined format to supervisory signals and for applying the latter signals to the junctors and/or bus of the PABX, a supervisory channel modulator using a predetermined supervisory channel correlation code for receiving and spread spectrum modulating said formulated polling and supervisory signals, RF modulating the latter signal and applying the RF modulated signal via the transmit band limiting filter to the leaky transmission line, a supervisory channel demodulator connected to the output of the receive band limiting filter for RF demodulating and despreading a received signal, and applying received poll and supervisory signals to the synchronization and control circuit, a plurality of unidirectional repeaters connected serially at spaced locations in the leaky transmission line whereby an input and an output to the line are defined, the output of the transmit band limiting filter being connected to the input of the transmission line and the input to the receive filter being connected to the output of the transmission line, the transmission line being coaxial cable having a shield containing gaps sufficient to allow RF energy to radiate therefrom.

* * * * *